United States Patent Office 3,291,621
Patented Dec. 13, 1966

3,291,621
ULTRAVIOLET LIGHT-ABSORBING GLASS
Erwin C. Hagedorn, Oregon, Ohio, assignor to Owens-Illinois Inc., a corporation of Ohio
No Drawing. Filed May 31, 1963, Ser. No. 284,314
8 Claims. (Cl. 106—52)

This invention relates to glasses which absorb ultraviolet radiation and short wave radiation within the visible spectrum and, more particularly, to compositions of such glasses.

The invention is of particular utility in the manufacture of glass bottles, jars, and other containers used for the packaging of food, beverage, and pharmaceutical products which are detrimentally affected by undesirable photochemical effects produced by such radiation.

In the case of comestible products marketed in glass bottles or other containers, the deterioration in the taste of the contents, such as beer, wine, ale, orange-flavored soft drinks, and the like, the development of rancidity in cooking oils, and the loss of vitamin C content of milk, are examples of such undesirable photochemical reactions. These reactions are caused by exposing the foodstuffs to ultraviolet radiation and also to some extent to short wave radiation within the visible spectrum. The ultraviolet region of the electromagnetic spectrum is that region near the visible spectrum including wavelengths from 20 to 380 millimicrons which are longer than X-rays and shorter than visible light rays. Generally, the ultraviolet portion of the spectrum is termed anything below 400 millimicrons, while the visible range comprises from about 400 to 700 millimicrons.

It is known that ultraviolet radiation is most productive of the enumerated undesirable photochemical effects. In order to eliminate at least in part some of the above-mentioned objectionable photochemical effects, amber glass has been utilized heretofore to absorb at least a portion of the ultraviolet radiation of the atmosphere. The amber glass has served to furnish "light protection" to the contained products. The term "light protection" is commonly applied to glasses adapted to protect against ultraviolet as well as visible radiation and, as used herein, this and like terms are intended to apply to protection against all such radiation which produces undesirable photochemical effects.

As defined in the U.S. Pharmacopoeia, vol. 12, pages 6 and 7, a "light-resistant container" is one which is opaque or designed to prevent photochemical deterioration of the contents beyond the official limits of strength, quality, or purity under customary conditions of handling, storage, shipment, or sale. The "light-resistant container" as defined therein shall be composed of a substance which in a thickness of 2 millimeters shall not transmit more than 10% of the incident radiation of any wavelength between 2900 and 4500 Angstrom units (290 and 450 millimicrons).

A desirable feature of glass bottles and other glass containers is their transparency, permitting the packaged goods to be visually inspected. In order to provide protection against photochemical effects, amber glass is used for some packaging such as beverage and pharmaceutical products where visibility of the contents is desired either for purposes of display or inspection, or for the detection of foreign particles, or for other purposes. However, the visibility through such amber glass is comparatively low. Thus, amber glass does not possess characteristics of transmitting a high level of visible light.

An ultraviolet radiation-absorbing glass giving better visibility and "light protection" than the known amber glass is described in U.S. Patent 2,974,052. Whereas the presence in the glass of from about 0.1 to 0.3% total chromium oxide, present as both trivalent chromium oxide ($Cr_2O_3$) and hexavalent chromium oxide ($CrO_3$) with the latter ranging from about 0.005 to 0.07% based upon the weight of the glass, imparts the desired properties to the glass, the color of the glasses produced in accordance with this invention is green. It has long been known that the presence of CoO in a glass composition imparts a blue color thereto. Howebver, when CoO is added to the composition of the glass set forth in U.S. Patent 2,974,052 to form a blue glass, the amount of CoO necessary is so great that the glass becomes opaque, thus defeating the attainment of an important requisite for a container glass for comestibles and potables, namely, visibility of the contents.

Accordingly, it is an object of the present invention to provide a glass of much better visibility than the known amber glass and which, at the same time, gives adequate "light protection."

It is an object of this invention to provide glass compositions having a blue coloration which possess characteristics of high ultraviolet ray absorption and visible ray transmittance.

Another object of this invention is to provide light-transmitting blue glasses having widely varied common base compositions, the glasses including a prescribed amount of hexavalent chromium and cobalt oxide to impart a high degree of ultraviolet ray absorption to the glass.

A further object of this invention is to provide blue glasses suitable for containers for beverages or foods which are now commonly retained in amber glass, and which new glasses will withstand increased exposure to sunlight and/or fluorescent light without deterioration of desirable properties of the products contained therein.

Still another object of this invention is to provide an ultraviolet radiation-absorbing glass, preferably a soda-lime-silica glass having C.I.E. colorimetric values for 10 mm. thickness of about 1–45% brightness, 5.0–95% purity, and 465 to 500 millimicrons dominant wavelengths.

In attaining the objects of this invention, one feature resides in preparing a base glass composition having a low total chromium level in a highly oxidized state, together with an amount of cobalt oxide sufficient to produce an ultraviolet radiation-absorbing glass having the aforesaid C.I.E. colorimetric values.

Other objects, features, and advantages of the present invention will become more apparent to those having ordinary skill in this art from the following description of the invention.

As explained above, an ultraviolet radiation-absorbing emerald green glass is disclosed in U.S. Patent 2,974,052. The ultraviolet radiation-absorption properties of the glass are due to the presence in the glass of from 0.1–0.3% total chromium oxides present as both trivalent chromium oxide ($Cr_2O_3$) and hexavalent chromium oxide ($CrO_3$), the latter chromium oxide ranging from about 0.005 to 0.070%, with the percentages being by weight of the glass composition. Such a glass composition has C.I.E. colorimetric values for 10 mm. thickness of about 25–52% brightness, 60–87% purity, and 554 to 565 millimicrons dominant wavelength.

However, all of the glass compositions formed in accordance with the teaching of the aforesaid patent produce glasses which are emerald green in color. The addition to the composition of cobalt oxide to impart a blue color to the glasses requires such a large amount of CoO as to render the resulting glasses opaque.

It has now been found that a blue ultraviolet radiation-absorbing glass can be formed when the total chromium content in the glass is considerably less than the total chromium content in the green glass of the aforesaid U.S. Patent 2,974,052, provided that the cobalt oxide content is within the range of .005 to .06% by weight of the composition. The total chromium content expressed as trivalent chromium oxide ($Cr_2O_3$) is within the range of .02 to .06% by weight of the composition, and the hexavalent chromium oxide ($CrO_3$) is present in an amount of from .0005 to .017% by weight of the composition. The obtaining of an ultraviolet radiation-absorbing glass having a dominant wavelength of from 465 to 500 millimicrons with an amount of total chromium oxide content in the glass which is considerably less than that disclosed in the aforesaid patent is believed to be due to a cooperative action of the chromium oxide and the cobalt oxide.

Commercial glasses made in accordance with the invention are prepared by controlling both the batch constituents of the glass as prepared and the melting and fining conditions under which they are melted, all as disclosed in U.S. Patent 2,974,052, and which disclosure is incorporated herein. This is obtained by an oxidizing atmosphere in the melter and/or the use of oxidizing agents in the glass batch as melted. The hexavalent chromium may be produced by employing alkali metal or alkaline earth chromate or dichromates in the batch composition. It has also been found that any other chromium-containing glass-forming material might be similarly employed as the source of the chromium. An alkali metal nitrate, such as potassium nitrate ($KNO_3$) or sodium nitrate ($NaNO_3$) is employed in the batch to produce a prescribed amount of oxidant depending upon the particular composition and melting conditions to secure the hexavalent chromium in the end product. It is necessary in preparing the composition that both the chromium-containing glass-forming material and the oxidant, such as an alkali metal nitrate, be used together to insure that at least a portion of the chromium either remains or is converted to the hexavalent state on melting and fining.

The chromium is added to the glass batch preferably either as potassium dichromate ($K_2Cr_2O_7$) or sodium dichromate ($Na_2Cr_2O_7 \cdot 2H_2O$) although other chromates or chromites may be similarly employed. The potassium dichromate which is stable in air offers certain advantages in the production of the subject glasses over sodium dichromate which is delinquescent. In melting and fining of the glass batch wherein chromates or dichromates or mixtures thereof are utilized as the chromium-containing material, at least a portion of the chromium is retained in the hexavalent state during melting, and is also so retained in the final glass product.

The chromium-containing materials employed in the glass batch may be comprised of chromium in its highest state of valence in the form of chromates and/or dichromates for securing the hexavalent chromium. In this case, a major portion of the hexavalent chromium is reduced to the trivalent state in the melting furnace, while a minor amount is retained in the hexavalent state in the final glass product.

In another procedure for practicing the present invention, the chromium-containing material consists of a mixture of chromate or dichromate and chromite, wherein the heat-reacted product of the chromium-containing materials consists of part hexavalent chromium oxide ($CrO_3$) and part trivalent chromium oxide ($Cr_2O_3$). In still another procedure, the chromium-containing material may be comprised entirely of trivalent chromium as in the case of utilizing iron chromate ($Fe_2Cr_2O_3$) as a batch constituent. In this case, an oxidant such as the alkaline nitrate, is placed in the glass batch and oxidizing conditions within the melting furnace are utilized to convert at least a portion of the trivalent chromium oxide ($Cr_2O_3$) into hexavalent chromium oxide ($CrO_3$).

The conditions for obtaining an ultraviolet-absorption glass as an end product are greatly affected by the melting and fining conditions of the glass. These conditions obviously vary considerably during the operation of a commercial open hearth type furnace, such as universally used in the manufacture of glass bottles, jars, or other containers. The normal operating variations frequently result in a lack of satisfactory control of the state of oxidation of the chromium present in the glass and it is imperative that either the melting and fining conditions or the batch constituents, or both, be carefully controlled to secure a desired level of hexavalent chromium oxide in the final product. Control over the melting and thus over the valence state of the chromium may be obtained by supplying oxygen into the batch from an oxygen bubbler disposed in the melting chamber for maintaining a slightly oxidizing atmosphere over the raw glass as melted. One form of apparatus and method for producing the subject ultraviolet-absorbing glass has been disclosed in the copending patent application of Joseph C. Hamilton, Ser. No. 713,857, filed February 7, 1958, and now abandoned, entitled "Method of Producing Ultraviolet Absorbing Green Glass," which application is assigned to the same assignee as the present application. A corresponding application, Ser. No. 786,358, filed November 13, 1959, is presently pending in Canada. As pointed out in the referred-to application, conditions for obtaining ultraviolet radiation-absorption glass in the melter are strongly affected by the melting conditions both as to atmosphere and constituents. Melting conditions vary considerably during the operation of a commercial open hearth furnace, such as universally used in continuous tank manufacturing of molten glass of consistent quality for forming and end-use demands in making bottles, jars, or other containers. The referred-to application of Hamilton provides method and means of eliminating melting variations and furnishes control over the hexavalent chromium oxide in the glass melt by an oxygen bubbler introducing oxygen into the glass during the melting period.

In the melting of the compositions of the present invention, the melting temperature ranges from 2700° F. to 2875° F. and the fining or conditioning temperatures range from 2000° F. to 2500° F.

An example of a glass batch which may be used in practicing the invention is as follows, in terms of pounds.

*Table I*

| Components: | Example 1 |
|---|---|
| Sand | 3296 |
| Soda ash | 1045 |
| Calcined limestone | 595 |
| Burnt dol. lime | 345 |
| Feldspar | 350 |
| Niter | 41 |
| Barytes | 49 |
| Potassium dichromate | 3.87 |
| Cobalt oxide | 3.21 |

Chemical analysis of the glass product produced from the above glass batch by melting at 2700° F. for a period of four hours in an oxidizing atmosphere is as follows.

*Table II*

| Chemical analysis: | Percentage by weight, Example 1 |
|---|---|
| $SiO_2$ | 71.11 |
| $Al_2O_3$ | 1.40 |
| CaO | 10.88 |
| MgO | 2.90 |
| BaO | .60 |
| $Na_2O$ | 12.58 |
| $K_2O$ | .40 |
| $Fe_2O_3$ (total iron) | .03 |
| $Cr_2O_3$ (total chromium) | .04 |
| $CrO_3$ (analyzed) | .0057 |
| CoO | .06 |
| | 100.00 |

C.I.E data (10 mm. thickness):

| | |
|---|---|
| Percent brightness | 1.5 |
| Percent purity | 79.0 |
| Dominant wavelength, m$\mu$ | 469 |

It will be noted that the glass contains a total chromium oxide content expressed as $Cr_2O_3$ and a portion of the chromium oxide is present in the hexavalent state, which is necessary in the glass in order for it to absorb ultraviolet radiation.

Other examples of suitable glass compositions which may be utilized are those having the following analyses (in percentage by weight):

*Table III*

| Chemical Analyses | Ex. 2 | Ex. 3 | Ex. 4 | Ex. 5 | Ex. 6 | Ex. 7 | Ex. 8 | Ex. 9 |
|---|---|---|---|---|---|---|---|---|
| $SiO_2$ | 71.57 | 71.54 | 71.55 | 71.57 | 71.57 | 71.56 | 70.74 | 67.68 |
| $Al_2O_3$ | 1.73 | 1.73 | 1.73 | 1.73 | 1.73 | 1.73 | 3.00 | 6.00 |
| CaO | 11.20 | 11.20 | 11.20 | 11.20 | 11.20 | 11.20 | 10.85 | 9.57 |
| MgO | 1.14 | 1.14 | 1.14 | 1.14 | 1.14 | 1.14 | .017 | 0.13 |
| $Na_2O$ | 13.44 | 13.44 | 13.44 | 13.45 | 13.44 | 14.45 | 14.45 | 15.23 |
| $K_2O$ | 0.35 | 0.35 | 0.35 | 0.34 | 0.34 | 0.35 | 0.56 | 1.16 |
| $B_2O_3$ | 0.47 | 0.48 | 0.48 | 0.50 | 0.49 | 0.48 | 0.03 | 0.03 |
| $Fe_2O_3$ | .035 | .035 | .035 | | | | 0.03 | 0.03 |
| $Cr_2O_3$ | 0.059 | 0.058 | 0.049 | 0.043 | 0.042 | 0.041 | 0.07 | 0.06 |
| $CrO_3$ | 0.0102 | 0.0106 | 0.0081 | 0.0051 | 0.0049 | 0.0057 | | |
| CoO | 0.040 | 0.049 | 0.050 | 0.029 | 0.042 | 0.053 | 0.045 | 0.045 |
| Color | Blue | Blue | Blue | Blue | Blue | Blue | Blue | Blue |

C.I.E. Colorimetric Values

| | | | | | | | | |
|---|---|---|---|---|---|---|---|---|
| Thickness of Specimen in mm | 10 | 10 | 10 | 10 | 10 | 10 | 10 | 10 |
| Percent Brightness | 3.0 | 1.7 | 1.5 | 7.3 | 3.1 | 1.5 | 3.1 | 3.2 |
| Percent Purity | 52.0 | 65.0 | 91.5 | 47.0 | 70.0 | 79.0 | 52.0 | 57.0 |
| Dominant Wave Length mm | 485 | 479 | 480 | 483 | 474 | 469 | 488 | 485 |

In making the glasses of Table III each batch composition was melted in a furnace having an air atmosphere at a temperature of 2700° F. for a period of 2 hours.

Table IV sets forth the transmittance values of each of the glasses in Table III.

*Table IV*

| | Ex. 2 | Ex. 3 | Ex. 4 | Ex. 5 | Ex. 6 | Ex. 7 | Ex. 8 | Ex. 9 |
|---|---|---|---|---|---|---|---|---|
| Thickness of Specimen in mm | 2 | 2 | 2 | 2 | 2 | 2 | 2 | 2 |

Radiation Transmittance

| Mu | Ex. 2 | Ex. 3 | Ex. 4 | Ex. 5 | Ex. 6 | Ex. 7 | Ex. 8 | Ex. 9 |
|---|---|---|---|---|---|---|---|---|
| 360 | 0.1 | 0.1 | 0.4 | 2.3 | 2.8 | 1.4 | 0.9 | 0.6 |
| 400 | 15.3 | 13.2 | 19.5 | 33.2 | 34.5 | 27.1 | 10.2 | 11.7 |
| 450 | 51.5 | 51.5 | 55.0 | 63.5 | 63.0 | 59.5 | 51.0 | 53.0 |
| 550 | 50.0 | 44.0 | 43.0 | 59.0 | 50.0 | 36.5 | 50.05 | 49.95 |
| 650 | 31.0 | 25.0 | 24.2 | 42.0 | 31.3 | 23.5 | 30.1 | 30.05 |

Since ultraviolet radiation has a wavelength of 400 millimicrons or less, it is apparent from the data set forth in Table IV that the glasses of the present invention effectively absorb substantially all of the ultraviolet radiation.

Furthermore, from Table III, Examples 8 and 9, it is noted that even with an increase in the amount of $Al_2O_3$ present in the composition, no adverse effect is noted in the ability of the glasses to absorb ultraviolet radiation.

Suitable compositions of the present invention can be summarized as follows:

*Table V*

| Components | Preferred Range Percent by Weight | Broad Range Percent by Weight |
|---|---|---|
| $SiO_2$ | 60-75 | 65-75 |
| $R_2O_3$ (total) | 0.1-10 | 0-10.0 |
| $Al_2O_3$ | 0.1-9.5 | 0-10.0 |
| $Fe_2O_3$ | less than 0.07 | 0-0.1 |
| CaO | 6-12 | 6-12 |
| BaO | 0-1.0 | 0-1.0 |
| $B_2O_3$ | 0-5 | 0-5 |
| MgO | 0-6 | 0-6 |
| $Na_2O$ | 10-20 | 10-20 |
| $K_2O$ | 0-1 | 0-1 |
| $Cr_2O_3$ (total) | .02-.06 | .02-.06 |
| $CrO_3$ | .0005-.017 | .0005-.017 |
| CoO | .005-.06 | .005-.06 |

The $R_2O_3$ in the analyses represents constituents such as other related metallic oxides which are commonly grouped together under this heading for analytical purposes. The $Fe_2O_3$ is preferably present in an amount of less than 0.07% and usually in an amount less than 0.04%. Blue glass compositions of Table V have C.I.E. colorimetric values for 10 mm. thickness of from about 1-45% brightness, about 5-95% purity, and from 465-500 millimicrons dominant wavelength.

The ultraviolet radiation-absorption glass compositions of this invention comprise a soda-lime-silica glass containing 0.02 to 0.06% total chromium oxides present as both trivalent chromium oxide ($Cr_2O_3$) and hexavalent chromium oxide ($CrO_3$), the latter chromium oxide ranging from 0.005 to 0.0017%, and a cobalt oxide content of from 0.005 to 0.06%, with the aforesaid percentages being by weight of the glass composition, and the glass formed by such a composition having C.I.E. colorimetric values for 10 mm. thickness of about 1 to 45% brightness, 5 to 95% purity and a dominant wavelength of from 465 to 500 millimicrons. With the dominant wavelength of 475-490, blue glasses of from about 47 to 91.5% purity are obtained, having a brightness of about 1 to 10% at 10 mm. thickness.

The C.I.E. colorimetric values are based upon the I.C.I. chromaticity diagram. C.I.E. refers to the First International Commission of Illumination and the diagram from which the values are taken defines color in terms of mixtures of theoretical colored lights. The C.I.E. system makes possible the exact specification of colors by means of a "color map." The C.I.E. system of color notation specifies the color of glasses in terms of brightness, purity and dominant wavelength. "Brightness" which is usually expressed in terms of percentage is the amount of visual response by a normal observer to the radiation emergent from a transparent object relative to the response in this observer to the radiation incident upon the object. Thus, brightness may be briefly termed the lightness of color of an object. "Purity" which is also normally expressed in terms of percentage is a measure of the monochromaticness of a color with monochromatic light having purity of 100%. By diluting the monochromatic radiation with white light made up of all wavelengths, we thereby dilute the color and reduce purity. "Dominant wave length," usually expressed in millimicrons ($m\mu$), is the wavelength of monochromatic light appearing to the eye to have the same hue as the mixed light actually encountered.

Having fully defined the invention, what is claimed is:

1. An ultraviolet radiation-absorbing glass composition comprising a glass containing from .02 to .06% total chromium oxides expressed as $Cr_2O_3$ and present as both trivalent chromium oxide ($Cr_2O_3$) and hexavalent chromium oxide ($CrO_3$), the hexavalent chromium oxide being present in an amount of from .0005 to .017%, and from .005 to .06% cobalt oxide, said percentages being by weight of said glass composition, and said composition having C.I.E. colorimetric values for 10 mm. thickness of from about 1–45% brightness, from about 5–95% purity, and from 465 to 500 millimicrons dominant wavelength.

2. An ultraviolet radiation-absorbing glass composition comprising a soda-lime-silica glass containing from .02 to .06% total chromium oxides expressed as $Cr_2O_3$ and present as both trivalent chromium oxide ($Cr_2O_3$) and hexavalent chromium oxide ($CrO_3$), the hexavalent chromium oxide being present in an amount of from .0005 to .017%, and from .005 to .06% cobalt oxide, said percentages being by weight of said glass composition, and said composition having C.I.E. colorimetric values for 10 mm. thickness of from about 1–45% brightness, from about 5–95% purity, and from 465 to 500 millimicrons dominant wavelength.

3. An ultraviolet radiation-absorbing blue glass composition comprising a glass containing from .02 to .06% total chromium oxides expressed as $Cr_2O_3$ and present as both trivalent chromium oxide ($Cr_2O_3$) and hexavalent chromium oxide ($CrO_3$), the hexavalent chromium oxide being present in an amount of from .0005 to .017%, and from .005 to .06% cobalt oxide, said percentages being by weight of said glass composition, and said composition having C.I.E. colorimetric values for 10 mm. thickness of from about 1–10% brightness, about 47–91% purity, and from 475–490 millimicrons dominant wavelength.

4. An ultraviolet radiation-absorbing blue glass composition comprising a soda-lime-silica glass containing from .02 to .06% total chromium oxides expressed as $Cr_2O_3$ and present as both trivalent chromium oxide ($Cr_2O_3$) and hexavalent chromium oxide ($CrO_3$), the hexavalent chromium oxide being present in an amount of from .0005 to .017%, and from .005 to .06% cobalt oxide, said percentages being by weight of said glass composition, and said composition having C.I.E. colorimetric values for 10 mm. thickness of from about 1–10% brightness, from about 5–95% purity, and from 475–490 millimicrons dominant wavelength.

5. An ultraviolet radiation-absorbing glass composition consisting essentially of the following ingredients:

| Ingredients— | Percent by weight |
| --- | --- |
| $SiO_2$ | 60–75 |
| $R_2O_3$ (total) | 0–10 |
| $Al_2O_3$ | 0–10 |
| $Fe_2O_3$ | 0–0.1 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ (total) | .02–.06 |
| $CrO_3$ | .0005–.017 |
| CoO | .005–.06 |

6. An ultraviolet radiation-absorbing glass composition consisting essentially of the following ingredients:

| Ingredients— | Percent by weight |
| --- | --- |
| $SiO_2$ | 60–75 |
| $R_2O_3$ (total) | 0.1–10 |
| $Al_2O_3$ | 0.1–9.5 |
| $Fe_2O_3$ | <0.07 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ (total) | .02–.06 |
| $CrO_3$ | .0005–.017 |
| CoO | .005–.06 |

7. An ultraviolet radiation-absorbing blue glass composition consisting essentially of the following ingredients:

| Ingredients— | Percent by weight |
| --- | --- |
| $SiO_2$ | 60–75 |
| $R_2O_3$ (total) | 0–10 |
| $Al_2O_3$ | 0–10 |
| $Fe_2O_3$ | 0–0.1 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ | .02–.06 |
| $CrO_3$ | .0005–.017 |
| CoO | .005–.06 | said composition having C.I.E. colorimetric values for 10 mm. thickness of from about 1–45% brightness, from about 5–95% purity, and from 465 to 500 millimicrons dominant wavelength.

8. An ultraviolet radiation-absorbing blue glass composition consisting essentially of the following ingredients:

| Ingredients— | Percent by weight |
| --- | --- |
| $SiO_2$ | 60–75 |
| $R_2O_3$ (total) | 0.1–10 |
| $Al_2O_3$ | 0.1–9.5 |
| $Fe_2O_3$ | <0.07 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ (total) | .02–.06 |
| $CrO_3$ | .0005–.017 |
| CoO | .005–.06 | said composition having C.I.E. colorimetric values for 10 mm. thickness of from about 1–45% brightness, from about 5–95% purity, and from 465 to 500 millimicrons dominant wavelength.

References Cited by the Examiner

UNITED STATES PATENTS

| Re. 25,456 | 10/1963 | Bacon et al. | 106—54 |
| 2,956,892 | 10/1960 | Duncan | 106—52 |
| 3,206,659 | 9/1965 | Goodman et al. | 106—47 |

HELEN M. McCARTHY, *Acting Primary Examiner.*

UNITED STATES PATENT OFFICE
CERTIFICATE OF CORRECTION

Patent No. 3,291,621                          December 13, 1966

Erwin C. Hagedorn

It is hereby certified that error appears in the above numbered patent requiring correction and that the said Letters Patent should read as corrected below.

Column 2, line 8, for "Howebver" read -- However --; column 5, Table V, under the heading "Broad Range Percent by Weight", line 1 thereof, for "65-75" read -- 60-75 --; column 6, line 52, for "0.005 to 0.0017%" read -- 0.0005 to 0.017% --.

Signed and sealed this 24th day of October 1967.

(SEAL)
Attest:

Edward M. Fletcher, Jr.                                EDWARD J. BRENNER
Attesting Officer                                           Commissioner of Patents